United States Patent
Mekkittikul et al.

(10) Patent No.: US 7,061,861 B1
(45) Date of Patent: Jun. 13, 2006

(54) METHOD AND SYSTEM FOR WEIGHTED FAIR FLOW CONTROL IN AN ASYNCHRONOUS METRO PACKET TRANSPORT RING NETWORK

(75) Inventors: Adisak Mekkittikul, Mountain View, CA (US); Nader Vijeh, Sunnyvale, CA (US)

(73) Assignee: Broadband Royalty Corporation, Wilmington, DE (US)

( * ) Notice: Subject to any disclaimer, the term of this patent is extended or adjusted under 35 U.S.C. 154(b) by 1144 days.

(21) Appl. No.: 09/611,180

(22) Filed: Jul. 6, 2000

(51) Int. Cl.
*G01R 31/08* (2006.01)
*H04J 1/16* (2006.01)
*H04L 12/26* (2006.01)

(52) U.S. Cl. .............. 370/230; 370/231; 370/395.21; 370/395.42; 370/412; 370/413; 370/415

(58) Field of Classification Search ............ 370/468, 370/358, 404, 230, 231, 232, 233, 234, 235, 370/238, 395.21, 412–419, 516, 519, 395.4, 370/395.42; 709/235; 710/52, 104
See application file for complete search history.

(56) References Cited

U.S. PATENT DOCUMENTS

| | | | |
|---|---|---|---|
| 6,219,728 B1 * | 4/2001 | Yin | 710/52 |
| 6,314,110 B1 * | 11/2001 | Chin et al. | 370/468 |
| 6,317,416 B1 * | 11/2001 | Giroux et al. | 370/232 |
| 6,452,933 B1 * | 9/2002 | Duffield et al. | 370/415 |
| 6,480,911 B1 * | 11/2002 | Lu | 710/54 |
| 6,714,517 B1 * | 3/2004 | Fawaz et al. | 370/236 |
| 6,850,540 B1 * | 2/2005 | Peisa et al. | 370/468 |

OTHER PUBLICATIONS

Aybay et al. "An Introduction to Resilient Packet Ring Technology" online Oct. 2001 (2001-10) Resilient Packet Ring Alliance, Internet XP002203153 retrieved from the Internet: <URL http//www.rpralliance.org/articles/RPRWh1 tePaper 10-01.pdf.

Habermann et al.: Das Dienstgutekonzept in ATM Netzen 1997, Verlat fur Wissenschat und Leben Georg Heidecker GmbH 92023 Erlangen, Germany XP002202823.

* cited by examiner

*Primary Examiner*—Wellington Chin
*Assistant Examiner*—Chuong Ho
(74) *Attorney, Agent, or Firm*—Oblon, Spivak, McClelland, Maier & Neustadt, P.C.

(57) ABSTRACT

A method and system for implementing weighted fair flow control on a metropolitan area network. Weighted fair flow control is implemented using a plurality of metro packet switches (MPS), each including a respective plurality of virtual queues and a respective plurality of per flow queues. Each MPS accepts data from a respective plurality of local input flows. Each local input flow has a respective quality of service (QoS) associated therewith. The data of the local input flows are queued using the per flow queues, with each input flow having its respective per flow queue. Each virtual queue maintains a track of the flow rate of its respective local input flow. Data is transmitted from the local input flows of each MPS across a communications channel of the network and the bandwidth of the communications channel is allocated in accordance with the QoS of each local input flow. The QoS is used to determine the rate of transmission of the local input flow from the per flow queue to the communications channel. This implements an efficient weighted bandwidth utilization of the communications channel. Among the plurality of MPS, bandwidth of the communications channel is allocated by throttling the rate at which data is transmitted from an upstream MPS with respect to the rate at which data is transmitted from a downstream MPS, thereby implementing a weighted fair bandwidth utilization of the communications channel.

7 Claims, 9 Drawing Sheets

| Flow ID | Valid | X-OFF | Action | P_Ring | C_Ring | Dist. | SIM Fanout | M/U | Protection | BE Weight |
|---|---|---|---|---|---|---|---|---|---|---|
| 0 bit | 1 bit | 1 bit | 1 bit | 1 bit | 1 bit | 2 bits | 9 bits | 1 bit | 1 bit | 5 bits |
| 1 | 1 | No | Kill | R1 | | Transit | 000000000 | 0 | Guarantee | 0 |
| 2 | 1 | Yes | Pass | R2 | | receive | 100000000 | 0 | BE(STD) | 1 |
| 3 | 1 | | Pass | R2 | | Transit. | 000000000 | 0 | | 0 |
| 4 | 1 | | Pass | R1 | | Insert | 000000001 | 0 | | 63 |
| 5 | 1 | | Pass | R1 | | copy | 100000000 | 1 | Guarantee | 0 |
| . | 0 | | | | | | | | | |
| . | | | | | | | | | | |
| 999999 | 1 | | | | | Insert | | | | 0 |

↑ Continued on sheet 9 / 9 ↑

Figure 8

| Reserved rate | R Finish time | S Finish time | R_OR | S_OR | Reserve | Note |
|---|---|---|---|---|---|---|
| 14 bits | 32 bits | 32 bits | 1 bit | 1 bit | 4 bits | 8.4 sec @ 5ns clk |
| 10 Mbps | 435ABC | 435ABC | | | | Backlogged flow |
| 80 Mbps | NULL | NULL | | | | Non-Backlogged flow |
| NULL | NULL | NULL | | | | Unused entry |
| 1 Gbps | 3535DF | 3535DF | | | | Backlogged flow |
| 100 Mbps | | | | | | Pickup for Multicast |
| . | . | . | | | | . |
| . | . | . | | | | . |
| . | . | . | | | | . |
| 8.5 Gbps | NULL | NULL | | | | Non-Backlogged flow |

↑ Continued from sheet 8 / 9 ↑

Figure 8 (Continued)

METHOD AND SYSTEM FOR WEIGHTED FAIR FLOW CONTROL IN AN ASYNCHRONOUS METRO PACKET TRANSPORT RING NETWORK

FIELD OF THE INVENTION

The present invention relates to the field of asynchronous metro packet transport ring networks. More specifically, the present invention pertains a data flow control method and system for managing the data flow with respect to the available bandwidth in a metro packet transport ring network.

BACKGROUND ART

The Internet is a general purpose, public computer network which allows millions of computers all over the world, connected to the Internet, to communicate and exchange digital data with other computers also coupled to the Internet. Once a computer is coupled to the Internet, a wide variety of options become available. Some of the myriad functions possible over the Internet include sending and receiving electronic mail (e-mail) messages, browsing different web sites, downloading and/or uploading files, etc. In the past, activities over the Internet were limited due to the relatively slow connection speeds of dial-up modems over standard telephone lines. However, as new technologies emerge, the speed at which one can connect onto the Internet is ever increasing. Now, users on the Internet have the bandwidth to participate in live discussions in chat rooms, play games in real-time, watch streaming video, listen to music, shop and trade on-line, etc. In the future, it is imagined that the bandwidth will be such that video-on-demand, HDTV, IP telephony, video teleconferencing, and other types of bandwidth intensive applications will soon be possible.

Indeed, telecommunications companies are now laying the foundation to dramatically increase the bandwidth of the Internet backbone. Significant upgrades are being made to the routing, networking, and cabling infrastructure to try and keep up with the explosion in Internet traffic. One approach by which bandwidth is being increased relates to fiber optics technology. By sending pulses of light through glass fibers no thicker than a human hair, vast amounts of digital data can be transmitted at extremely high speeds. And with the advent of dense wavelength division multiplexing, different wavelengths of light can be channeled over the same, single fiber strand, thereby increasing its capacity several fold.

However, there is a problem with distributing the bandwidth of this new fiber optic network to end users. Essentially, this next-generation information superhighway has no real, sufficient entrance or exit ramps. Presently, service providers are using traditional local area network (LAN) switches and routers manufactured by companies such as Cisco, Nortel, and Lucent to perform the function of packet routing. Digital data is packetized; when a packet is transmitted by a user, that packet is examined and routed to its destination according to its IP address contained within that packet.

Although this process is standard and well-accepted, it suffers from several drawbacks. Namely, packets are transmitted asynchronously and sent unreliably through the Internet. Due to traffic congestion, network availability, routing conditions, and other uncontrollable external factors, this process is highly unreliable and unpredictable. Basically, packets vie for available bandwidth and are routed according to a best-effort delivery model. As such, the reliability of traditional LAN switches and routers is limited to approximately 80 percent. Consequently, it is virtually impossible to provide any kind of quality of service (QoS) using traditional LAN switches and routers. QoS refers to the guarantee of providing timely delivery of information, controlling bandwidth per user, and setting priorities for select traffic. For real-time applications such as video on demand, HDTV, voice communications, etc., dropped packets or late-arriving packets can seriously disrupt or even destroy performance. And for many Internet Service Providers (ISP's), Applications Service Providers (ASP's), web sites/portals, and businesses, it is of paramount importance that they have the ability to provide a certain minimum threshold bandwidth. For example, a e-commerce or business web site may lose critical revenue from lost sales due to customers not being able to access their site during peak hours.

Because QoS is so highly desired by some users, there are mechanisms which have been developed to provide QoS functionality. However, these mechanisms are all extremely expensive to implement. One mechanism is commonly referred to as T-carrier services (e.g., T1 line for carrying data at 1.544 Mbits/sec. and T3 line for carrying data at a much faster rate of 274.176 Mbits/sec.). These T1 and T3 lines are dedicated point-to-point data links leased out by the telephone companies. The telephone companies typically charge long distance rates (e.g., $1,500–$20,000 per month) for leasing out a plain old T1 line. Another commonly used mechanism for achieving QoS relates to Synchronous Optical Network (SONET). As with T-carrier services, SONET uses time division multiplexing (TDM) to assign individual channels to pre-determined time slots. With TDM, each channel is guaranteed its own specific time slot in which it can transmit its data. Although TDM enables QoS, it is costly to implement because both the transmitter and receiver must be synchronized at all times. The circuits and overhead associated with maintaining this precise synchronization is costly. Furthermore, TDM based networking technologies are highly inefficient in that if a user does not transmit data within his dedicated time slot, that time slot goes empty and is wasted. In other words, TDM employs a use-it-or-lose-it approach whereby unused bandwidth is totally wasted; unused bandwidth cannot be reallocated to a different user.

Although the Internet backbone is being substantially overhauled to substantially increase its bandwidth, there is no mechanism in place today for distributing this bandwidth to end users that is cost-efficient yet which also has the ability of providing QoS. The present invention provides a solution to this networking need.

SUMMARY OF THE INVENTION

The present invention pertains to a metropolitan packet transport ring network (MPTR) that efficiently allocates bandwidth to users in accordance with their respective required QoS (quality of service). To addresses the ever-increasing need for ever increasing amounts of data transport bandwidth, the Internet backbone is continually being upgraded to substantially increase its data transfer bandwidth. New technologies are rapidly being introduced which increase the data transport capacity of the Internet backbone by several orders of magnitude. The present invention provides a method and system for distributing this bandwidth to end users in a manner that is cost-effective and which allocates bandwidth on the basis of the user's required QoS.

In one embodiment, the present invention is implemented as a method and system for effecting weighted fair flow control in a metropolitan packet transport ring network (MPTR). The MPTR is comprised of a fiber optic ring through which packetized data flow asynchronously in one direction. Coupled to this fiber optic ring are a number of metropolitan packet switches (MPS's). An MPS allows packetized data from an upstream MPS to flow through to a downstream MPS over a segment of the fiber optic ring. The MPS also puts packetized data onto and pulls packetized data off of the fiber optic ring. Computing and networking devices such as personal computers, servers, modems, set-top boxes, routers, etc., access the fiber optic ring via the MPS's.

Weighted fair flow control is implemented by using the number of MPS's. Each MPS accepts data from a respective plurality of local input flows. Each MPS also monitors transit flows as they propogate through the ring segments. Each flow (local input flow and transit flow) has a corresponding "virtual" queue implemented within the MPS's. Additionally, each flow has a respective quality of service (QoS) associated therewith. The local input flows are the data from the various digital devices (e.g., computing and networking devices such as personal computers, servers, modems, set-top boxes, routers, etc.) of the users. The transit flows are the flows previously inserted into the ring as they make their way from ring segment to ring segment. The data of the local input flows are physically buffered using respective per flow queues within each MPS on a FIFO (first in first out) basis. The flow rate of all flows (e.g., both transit flows and local input flows) are tracked using the virtual queues, with each flow having its own respective virtual queue. Each virtual queue maintains a track of the flow rate of its respective flow, providing the information needed by the MPS's to maintain QoS based bandwidth allocation. Data is transmitted from the local input flows of each MPS across a communications channel of the network (in this embodiment, the fiber-optic ring) and the bandwidth of the communications channel is allocated in accordance with the QoS of each flow.

The QoS is used to determine the rate of transmission of the flows to the communications channel. This implements an efficient weighted bandwidth utilization of the communications channel. Among the number of MPS within the MPTR, bandwidth of the communications channel is allocated by throttling the rate at which data is transmitted from, for example, one or more upstream MPS with respect to the rate at which data is transmitted from a downstream MPS (e.g., the MPS experiencing congestion), thereby implementing a "fair" bandwidth utilization of the communications channel.

In so doing, the present invention solves the strict priority problem common to ring topology networks. Ring topology networks are known to have an up-stream strict priority problem wherein upstream nodes (e.g., one or more upstream MPS's) have larger amounts of available bandwidth in the communications channel in comparison to downstream nodes. The present invention solves this problem by throttling the rate at which data is transmitted from the upstream MPS's with respect to the rate at which data is transmitted from the downstream MPS's to implement a weighted fair bandwidth utilization of the communications channel. Thus, the weighted fair bandwidth utilization scheme is implemented without resorting to inefficient circuit switching approaches such as TDM or fixed wavelength assignment, which waste bandwidth when a flow is idle and which can introduce excessive buffering delay.

BRIEF DESCRIPTION OF THE DRAWINGS

The present invention is illustrated by way of example and not by way of limitation, in the figures of the accompanying drawings and in which like reference numerals refer to similar elements and in which:

FIG. 8 shows a table depicting the structure of a flow description database as maintained in each MPS.

DETAILED DESCRIPTION OF THE INVENTION

Reference will now be made in detail to the embodiments of the invention, a method and system for weighted fair flow control in an asynchronous metro packet transport ring network, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention are directed to a method and system for effecting weighted fair flow control in a metropolitan packet transport ring network (MPTR). Weighted fair flow control is implemented by using a number of MPS's coupled to the MPTR. Each MPS accepts data from a respective plurality of local input flows, each having a corresponding per flow queue. Each MPS also monitors a plurality of transit flows propagating through the ring. The data of the local input flows are queued on a FIFO basis using using respective per flow queues. Each flow (local input flows and transit flows) has its own respective virtual queue, with each virtual queue maintaining track of the flow rate of its respective flow, and the state of each flow (e.g., active vs. inactive). Data from all flows of each MPS are transmitted across the MPTR in accordance with the QoS of each flow. The present invention and its benefits are further described below.

Figure 1:
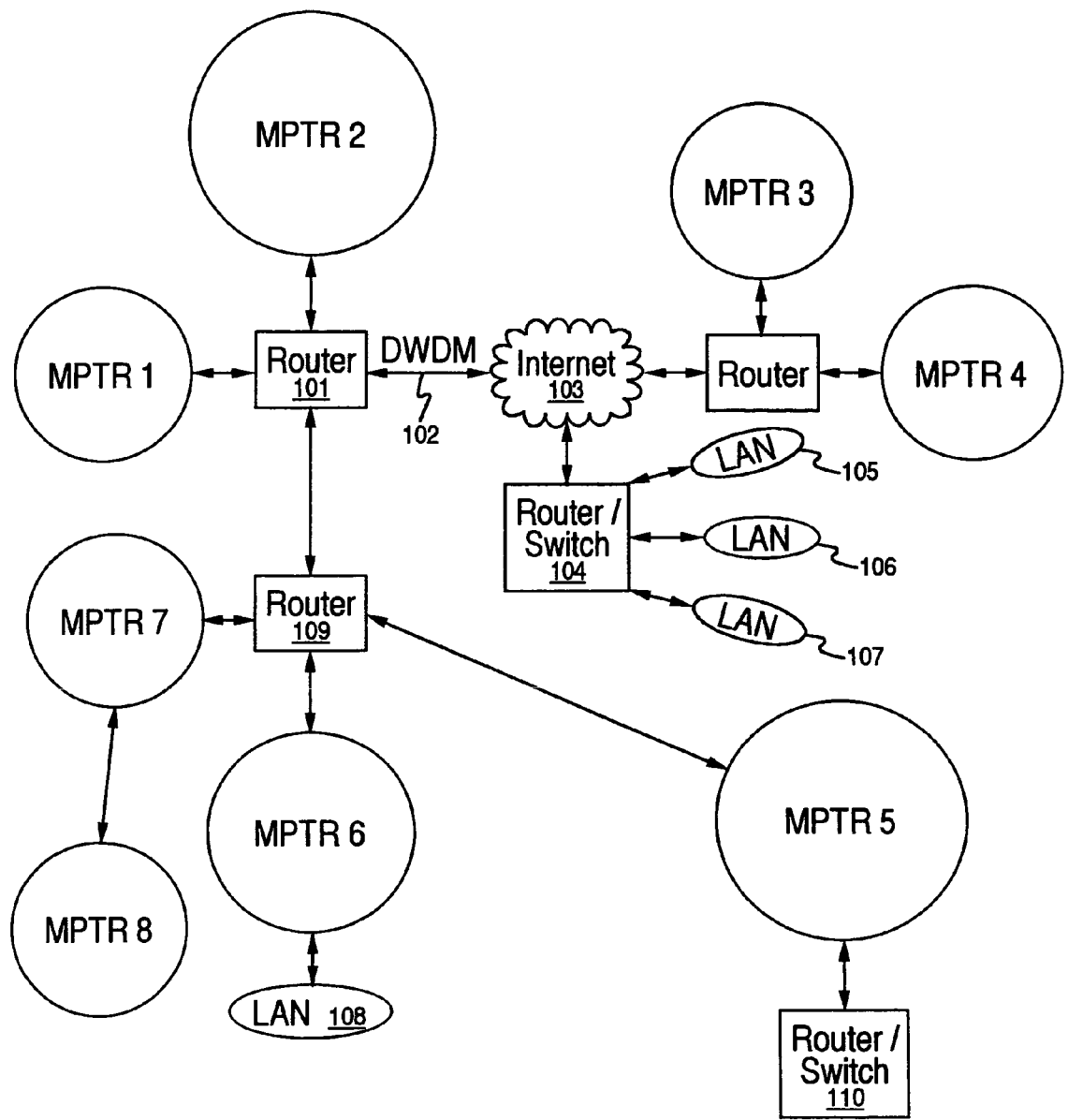
FIG. 1 shows the overall architecture of the asynchronous metro packet transport ring network according to the currently preferred embodiment of the present invention.

FIG. 1 shows an overall architecture of an asynchronous metro packet transport ring network in accordance with a currently preferred embodiment of the present invention. A metropolitan packet transport ring (MPTR) consists of a ring which is laid to transmit data packets in a metropolitan area network (MAN). A MAN is a backbone network which spans a geographical metropolitan area. Typically, telephone companies, cable companies, and other telecommunications providers supply MAN services to other companies, businesses, and users who need access to networks spanning public rights-of-way in metropolitan areas. In the currently preferred embodiment, the communications channel of the MPTR is implemented using a ring topology of installed fiber optic cables. Other less efficient transmission mediums such as hybrid fiber coax, coax cables, copper wiring, or even wireless (radio frequency or over-the-air laser beams) can be used or substituted in part thereof.

Users coupled to a particular MPTR can transmit and receive packetized data to/from each other through that MPTR. For example, a personal computer coupled to MPTR1 can transmit and received data packets to/from a server also coupled to MPTR1. Furthermore, data packets originating from one MPTR can be routed to another MPTR by means of a router. For example, a computer coupled to MPTR1 can transmit data packets over its fiber ring to a router 101 to MPTR2. The data packets can then be sent to its final destination (e.g., a computer coupled to MPTR2) through the fiber ring associated with MPTR2. It should be noted that the MPTR rings can be of various sizes and configurations. Although the currently preferred embodiment contemplates the use of a ring, the present invention can also utilize other types of topologies. The MPTRs can also be coupled onto the Internet backbone via a router. For example, MPTR1 can be coupled to a dense wavelength division multiplexed (DWDM) fiber backbone 102 by means of router 101. Thereby, users coupled to MPTR1 has access to the resources available on traditional Internet 103. Note that the present invention can be used in conjunction with traditional Internet schemes employing standard routers, switches, and other LAN equipment 104–107. And any number of MPTR's can thusly be coupled together to gracefully and cost-efficiently scale to meet the most stringent networking demands which may arise. And as one particular ring becomes overloaded, a second, third, forth, etc. MPTR may be added to accommodate the increased load. These MPTR's can be coupled to the same router (e.g., MPTR5, MPTR6, and MPTR7) or may alternatively be coupled to different routers.

Not only does the present architecture scale gracefully, it also offers great flexibility. In one embodiment, an MPTR can be used to support one or more LANs. For instance, MPTR6 may support traffic flowing to/from LAN 108. Optionally, it is conceivable that an MPTR may be coupled directly to another MPTR. In this manner, data flowing in MPTR8 can be directly exchanged with data packets flowing through MPTR7. Alternatively, a single MPTR can have multiple entries/exits. For example, MPTR5 is coupled to both router 109 as well as router/switch 110. Thereby, users on MPTR5 have the ability to transmit and receive data packets through either of the two routers 109 or 110. Virtually any configuration, protocol, medium, and topology is made possible with the present MPTR invention.

Figure 2:
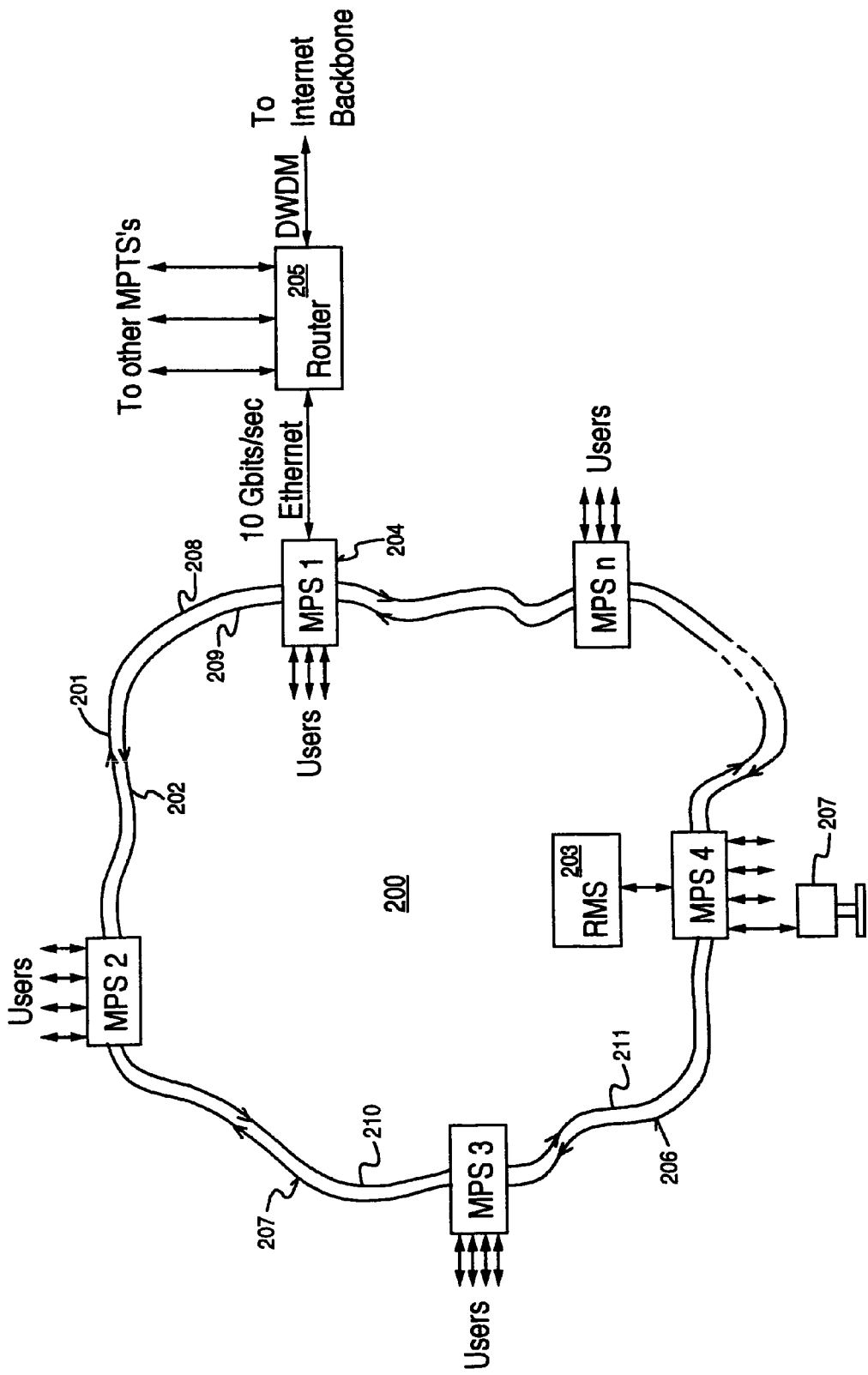
FIG. 2 shows an exemplary Metro Packet Transport Ring.

The implementation and functionality of an MPTR is now described. Referring to FIG. 2, an exemplary Metro Packet Transport Ring 200 is shown. It can be seen that MPTR 200 is comprised of two fiber cable rings, or rings, 201 and 202; a number of Metro Packet Switches (MPS1–MPSn); and a Ring Management System (RMS) 203. The physical layer of an MPTR is actually comprised of two redundant fiber cable rings 201 and 202. Data packets flow in opposite directions through the two rings (e.g., clockwise in ring 201 and counter-clockwise in ring 202). Dispersed along the fiber rings 201 and 202 are a number of Metro Packet Switches (MPS's). An MPS is coupled to both of the fiber rings 201 and 202. Thereby, if there is a break in one segment of the fiber ring, data can be redirected through one of the MPS's to flow through the other, operational fiber ring. Alternatively, traffic can be re-directed to minimize localized congestion occurring in either of the rings.

In the currently preferred embodiment, each MPTR can support up to 254 MPS's. An MPS is a piece of equipment which can be housed in specially designed environmental structures or it can be located in wiring closets or it can reside at a place of business, etc. The distances between MPS's can be variable. It is through an MPS that each individual end user gains access to the fiber rings 201 and 202. Each individual end user transmits packetized data onto the MPS first. The MPS then schedules how that packetized data is put on the fiber ring. Likewise, packetized data are first pulled off a fiber ring by the MPS before being sent to the recipient end user coupled to the MPS. In the currently preferred embodiment, a single MPS can support up to 128 end users. An end user can be added to an MPS by inserting a line interface card into that particular MPS. The line interface cards provide I/O ports through which data can be transferred between the MPS and its end users. Different line interface cards are designed in order to meet the particular protocol corresponding to that particular end user. Some of the protocols supported include T1, T3, SONET, Asynchronous Transfer Mode (ATM), digital subscriber line (DSL) Ethernet, etc. It should be noted that line interface cards can be designed to meet the specifications of future protocols. In this manner, end users such as mainframe computers, workstations, servers, personal computers, set-top boxes, terminals, digital appliances, TV consoles, routers, switches, hubs, and other computing/processing devices, can gain access to either of the fiber rings 201 and 202 through an MPS.

Not only does an MPS provide I/O ports to end users, but an MPS also provides a means, for inputting packetized data into the MPTR and also for outputting packetized data out from the MPTR. For example, data packets are input to MPTR 200 via MPS 204 which is coupled to router 205. Similarly, data packets are output from MPTR 200 via MPS 204 to router 205.

Another function of an MPS entails passing along incoming data packets originating from an upstream MPS to the next downstream MPS. An MPS receives upstream data packets forwarded from an upstream MPS via an input fiber port coupled to the fiber ring. Data packets received from the fiber ring are examined by that MPS. If the data packet is destined for an end user coupled to that particular MPS, the data packet is routed to the appropriate I/O port. Otherwise, the MPS immediately forwards that data packet to the next downstream MPS as quickly as possible. The data packet is output from the MPS by an output fiber port onto the fiber ring. It should be noted that such pass-through packets flowing from an upstream fiber ring segment, through the MPS, and onto a downstream fiber ring segment, always takes priority over packets waiting to be inserted onto the fiber ring by the MPS. In other words, the MPS puts data packets generated by its end users only as bandwidth permits.

An example is now offered to show how data packets flow in an MPTR. With reference to FIG. 2, a computer 207 coupled to MPS4 can transmit and receive data to/from the Internet as follows. Data packets generated by the computer are first transmitted to MPS4 via a line coupled to a line interface card residing within MPS4. These data packets are then sent on to MPS3 by MPS4 via ring segment 206. MPS3 examines the data packets and passes the data packets downstream to MPS2 via ring segment 207; MPS2 examines the data packets and passes the data packets downstream to MPS1 via ring segment 208. Based on the addresses contained in the data packets, MPS1 knows to output theses data packets on to the I/O port corresponding to router 205. It can be seen that MPS1 is connected to a router 205. Router 205 routes data packets to/from MPTR 200, other MPTR's, and the Internet backbone. In this case, the data packets are then routed over the Internet to their final destination. Similarly, data packets from the Internet are routed by router 205 to MPTR 200 via MPS1. The incoming data packets are then examined and forwarded from MPS1 to MPS2 via ring segment 209; examined and forwarded from MPS2 to MPS3 via ring segment 210; and examined and forwarded from MPS3 to MPS4 via ring segment 211. MPS4 examines these data packets and determines that they are destined for computer 207, whereby MPS4 outputs the data packets through its I/O port corresponding to computer 207.

Likewise, users coupled to any of the MPS's can transmit and receive packets from any other MPS on the same MPTR without having to leave the ring. For instance, a user on MPS2 can transmit data packets to a user on MPS4 by first transmitting the packets into MPS2; sending the packets from MPS2 to MPS3 over ring segment 207; MPS3 sending the packets to MPS4 over ring 202; and MPS4 outputting them on the appropriate port corresponding to the intended recipient.

Although different protocols are supported by the present invention, the currently preferred embodiment utilizes a single protocol from origination to its final destination. Since most computers have adopted Ethernet network interface cards, the present invention transmits Ethernet data packets through as much of the networking scheme as possible. For example, a computer transmits Ethernet packets to its MPS. These Ethernet packets are carried through the fiber ring which consists of 10 Gbit Ethernet physical layer. Each ring can have a circumference of up to 150 kilometers. The MPTR is connected to an external router by means of one or more 10 Gbit Ethernet lines (e.g., fiber cable). The external router is connected to one or more DWDM Gigabit Ethernet fiber cables which is connected at the other end to another router. This other router is connected to a destination MPTR via another 10 Gbit Ethernet line. The MPTR has 10 Gbit Ethernet rings. The Ethernet packets are then sent through the ring to its intended destination as Ethernet. As such, data originates as Ethernet packets, are routed through the various physical mediums as Ethernet packets, and are received by the recipient as Ethernet. With the present invention, there is no need to convert data to different formats or protocols and then subsequently reconvert the data back. Because the present invention saves on the associated processing overhead, data can be sent faster and more economically.

Referring still to FIG. 2, it should be noted that the present invention solves the strict priority problems common to ring topology networks. The strict priority problem refers to the fact that upstream nodes (e.g., an upstream MPS) have larger amounts of available bandwidth in the communications channel in comparison to downstream nodes. For example, in the case of ring segment 210, MPS 2 is able to insert its local input flows (e.g., insertion traffic) onto segment 210 prior to MPS 3, and so on with MPS 3 and MPS 4 with ring segment 211. Hence, MPS 4, by virtue of its location within the ring topology, has less available bandwidth to insert its local input flow in comparison to MPS 3 and MPS 2.

The present invention solves this strict priority problem by "throttling" the rate at which data is transmitted from the upstream MPS's (e.g., MPS 2, MPS 3, etc.) with respect to the rate at which data is transmitted from the downstream MPS's (e.g., MPS 4, MPS n, etc.) to implement a weighted fair bandwidth utilization of the communications channel. The weighted fair bandwidth utilization scheme of the present invention is implemented without resorting to inefficient circuit-switch-like strict partitioning or full packet switching and buffering. Each of these methods has some drawback. Circuit switch approaches, such as TDM or fixed wavelength assignment, wastes bandwidth when a flow is idle. Packet switching can introduce excessive buffering delay for a ring with large number of nodes.

The weighted fair bandwidth utilization method the present invention is now described. As described above, weighted fair flow control for efficient bandwidth utilization is implemented by using the MPS's to control the rate at which local input flows are inserted into the communications channel (e.g., the ring). In so doing, the present invention implements a "source-controlled" strategy instead of circuit-switch-like strict partitioning, or full packet switching and buffering. Source controlled flow functions well for an MPTR because a typical metro ring is not inordinately wide (e.g., spread across a large geographical area), as is often the case with a wide area ring. By controlling the sources (e.g., each MPS's insertion traffic), each MPS avoids the need to buffer or drop transit packets (e.g., those packets already inserted onto the communications channel). Instead each MPS monitors traffic within the communications channel and periodically sends explicit bandwidth allocation messages to every MPS on the communications channel. Each MPS can also send a warning to any of its respective local input flow sources when it detects a violation in the agreed local input flow rate. For example, to preserve the efficiency of the network, packets from an uncooperative local input flow source can and/or will be dropped. But since all MPS's on the communications channel are designed to cooperate and have uniform traffic policy, the dropping of packets is merely a last resort network safety mechanism that is not supposed to occur in normal operation.

Figure 3:
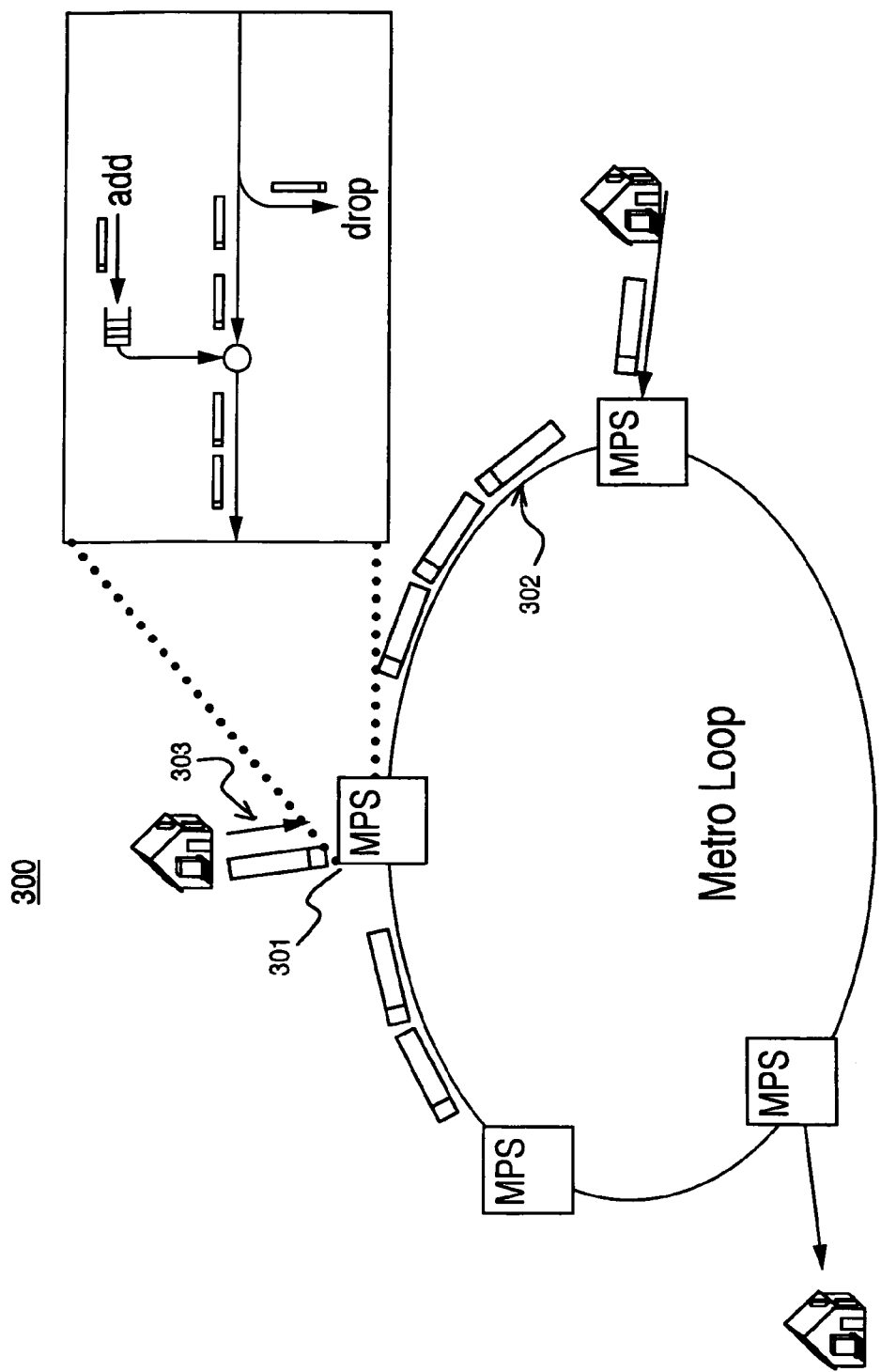
FIG. 3 shows an overview diagram of the add/drop routing functionality of the MPS within the Metro Packet Transport Ring.

Referring now to FIG. 3, a diagram 300 depicting the operation of one MPS 301 is shown. As depicted in diagram 300, MPS 301 can be viewed as an intelligent packet add/drop multiplexer with integrated per flow QoS monitoring and enforcing. MPS 301 routes (e.g., drops) an incoming packet from the communications channel 302 if its destination MPS ID matches the ID of the MPS 301 (or FlowID indicates so). An MPS also adds its local traffic one the communications channel, as shown by arrow 303. MPS 301 inserts local input flow traffic 303 only when it sees a gap unused by transit traffic. In other words, transit packets within communications channel 302 have strictly highest priority and therefore do not have to be buffered. At its egress, each MPS monitors the traffic of every flow, local or transit. Based on total reserved bandwidths, it allocates a peak rate to each flow in similar manner as some other well-known traditional QoS schemes.

Although it may appear that the above MPS weighted fair queuing priority scheme would result in unacceptable performance since local input flow traffic is treated unfairly by an MPS due to its lower priority in comparison to transit traffic, experiments show that this is not the case. The queuing delay of an MPS in accordance with the present invention (e.g.; MPS 301) is much lower than the delay/ latency of existing prior art approaches. This is largely due to the fact that in the present embodiment, packets are buffered only once at the inserting MPS. In other words, once a packet has been inserted into the communications channel, the packet traverses the channel on the fast path until reaching its destination.

Figure 4:
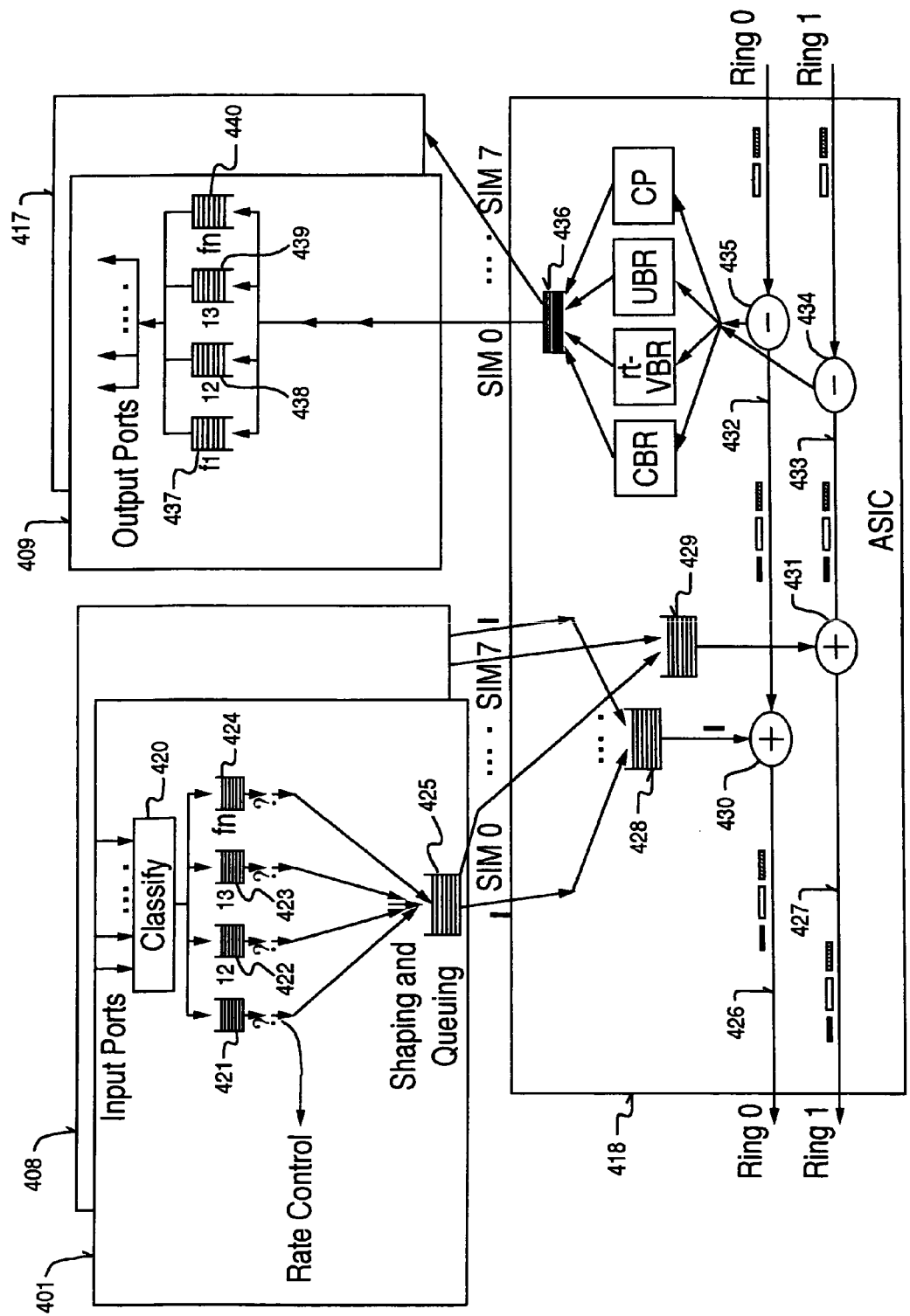
FIG. 4 shows the block diagram of the currently preferred embodiment of an MPS.

FIG. 4 shows the block diagram of the currently preferred embodiment of an MPS. The MPS is comprised of a number of input port modules 401–408 and output port modules 409–417 coupled to an application specific integrated circuit (ASIC) 418. An input port module accepts a number of incoming flows and classifies each flow per classifier circuit 420. Each flow has its own buffer (e.g., buffers 421–424) for queuing the data associated with each flow. Each buffer has an associated rate controller which varies the rate of the flow coming out from that particular buffer. The rate is controlled on a per-flow basis. After rate control, the data output from each of the buffers are then collectively stored in another buffer 425. The data is then eventually output from buffer 425 to either of the two fiber loops 426 or 427. Buffer 428 is used to collate all the data originating from the input modules 401–408. An inserter 430 inserts the data output from buffer 428 with the upstream data on segment 432. Consequently, flows from the input port modules 401–408 are inserted and sent downstream on fiber loop 426. Likewise, buffer 429 collates all the data output from the input modules 401–408. Inserter 431 inserts the data from buffer 429 with the upstream data on segment 433. Consequently, flows from the input port modules 401–408 are inserted and sent downstream on fiber loop 427.

The MPS examines each data packet incoming on fiber loops 426 and 427. If a particular data packet is destined to one of the output ports associated with the MPS, then that data packet is pulled out from the fiber loop. Removal circuit 434 removes appropriate data packets from fiber loop 427, and removal circuit 435 removes appropriate data packets from fiber loop 426. Buffer 436 sends the data packets pulled from the fiber loops 426 and 427 to the appropriate output port modules 409–417. Once an output module accepts a data packet, that data packet is queued in one of the buffers 437–440. Data packets are output from the data output modules on a per-flow basis.

As described above, weighted fair flow control is implemented by using all MPS's on a ring. Each MPS accepts data from a respective plurality of local input flows. Each local input flow is bufferd (on a FIFO basis) using a respective buffer within the MPS. All flows (e.g., local input flows and transit flows) also have corresponding "virtual" queues implemented within each respective MPS (described in greater detail below). Additionally, each flow has a respective quality of service (QoS) associated therewith. The local input flows are the data from the various digital devices (e.g., computing and networking devices such as personal computers, servers, modems, set-top boxes, routers, etc.) of the users. The data of the local input flows are queued using the per flow queues (e.g., buffers) prior to insertion into the communications channel. Each virtual queue maintains a track of the flow rate of its respective flow. With respect to local input flows in each individual MPS, the virtual queue of each local input flow also maintains state information regarding its respective local input flow (e.g., active vs. inactive, QoS compliant vs. non-QoS compliant, etc.). Data is transmitted from the local input flows of each MPS across a ring of the network (in this embodiment, the fiber-optic ring) and the bandwidth of the ring is allocated in accordance with the QoS of each local input flow. The the initial provisioning and coordinated operation of all MPS's coupled to the ring is managed by a ring management system (RMS).

The RMS is basically a computer system coupled to one of the MPS's which has software processes for implementing the initial set-up and configuration of the operation of each of the MPS's on that particular MPTR. For example, one function of the RMS is to provision bandwidth allocation within the respective MPS for new users and assign a corresponding QoS level in accordance with the characteristics of the new users' accounts. Once provisioned, it is the function of the MPS's collectively to coordinate bandwidth usage and allocation among the many users, or data flows, of an MPTR. Generally, the MPS's collectively allocate bandwidth dynamically in accordance with the specified "per-flow" QoS. Thereby, the present invention can guarantee constant bit rate services, variable bit rate services with a minimal floor bandwidth, as well as tailored service level agreements, all on a per-flow basis. Each MPS on the MPTR also aggressively reallocates unused bandwidth amongst currently active users on the MPTR, thereby efficiently utilizing the entire bandwidth of the MPTR at all times.

The way by which QoS is achieved by the MPS's on an MPTR is now described. In the present invention, data packets are transmitted and received over the MPTR asynchronously. In other words, users transmit and receive data packets without being synchronized with their counterparts. This means that the present invention eliminates the need for implementing expensive timing circuits and adhering to strict synchronization schedules. Instead of using synchronization or TDM to achieve QoS, the present invention provides QoS by implementing a source flow control technique, regulating which local input flows from an MPS are allowed onto a ring and their respective flow rates. Once data packets are inserted into the ring, they are transported through the ring at maximum speed. Given that a ring has a maximum bandwidth, once transit traffic is at maximum bandwidth, insertion traffic users are prioritized according to their QoS level such that the packets from users with higher priority are inserted onto the ring ahead of the packets from users with lower priority. The multiple MPS's collectively coordinate their operation, throttling their respective insertion traffic data rates, to maintain an efficient weighted fair bandwidth allocation while ensuring the integrity of specified per flow QoS levels.

For example, in a case where there is one user who pays for a higher level of service, the user's respective MPS is programmed to give higher priority to that specific user. Accordingly, the MPS weights its allocation for inserting packets transmitted by that particular user onto the ring (e.g., allocates a larger portion of its insertion traffic to that user). For example, if the ring happens to be congested at that particular instant, the flow rates of the packets from other users coupled to the MPS are temporarily reduced and restored at a later time, as bandwidth permits. In other words, the flow rate of lower priority packets is temporarily reduced by the MPS, and are restored to their previous rate at a later time, as bandwidth becomes available.

Furthermore, because data packets are transmitted asynchronously through the MPTR, unused bandwidth can be allocated to active users. In contrast, in a TDM scheme, time slots are reserved for specific users. If a particular time slot is not used (e.g., because its user is not active at that particular instant in time), the time slot is wasted. However, the present invention allocates virtually the entire bandwidth of a ring to existing, active users. When a user stops transmitting/receiving data packets, the amount of bandwidth available over the ring increases. This available bandwidth can be assigned to other users who are currently active on that ring. Each MPS constantly monitors the congestion on each of the two rings and assigns unused bandwidth to be allocated amongst active users. Thus, with the present invention, the entire bandwidth for each of the rings is most efficiently utilized all the time.

Figure 5:
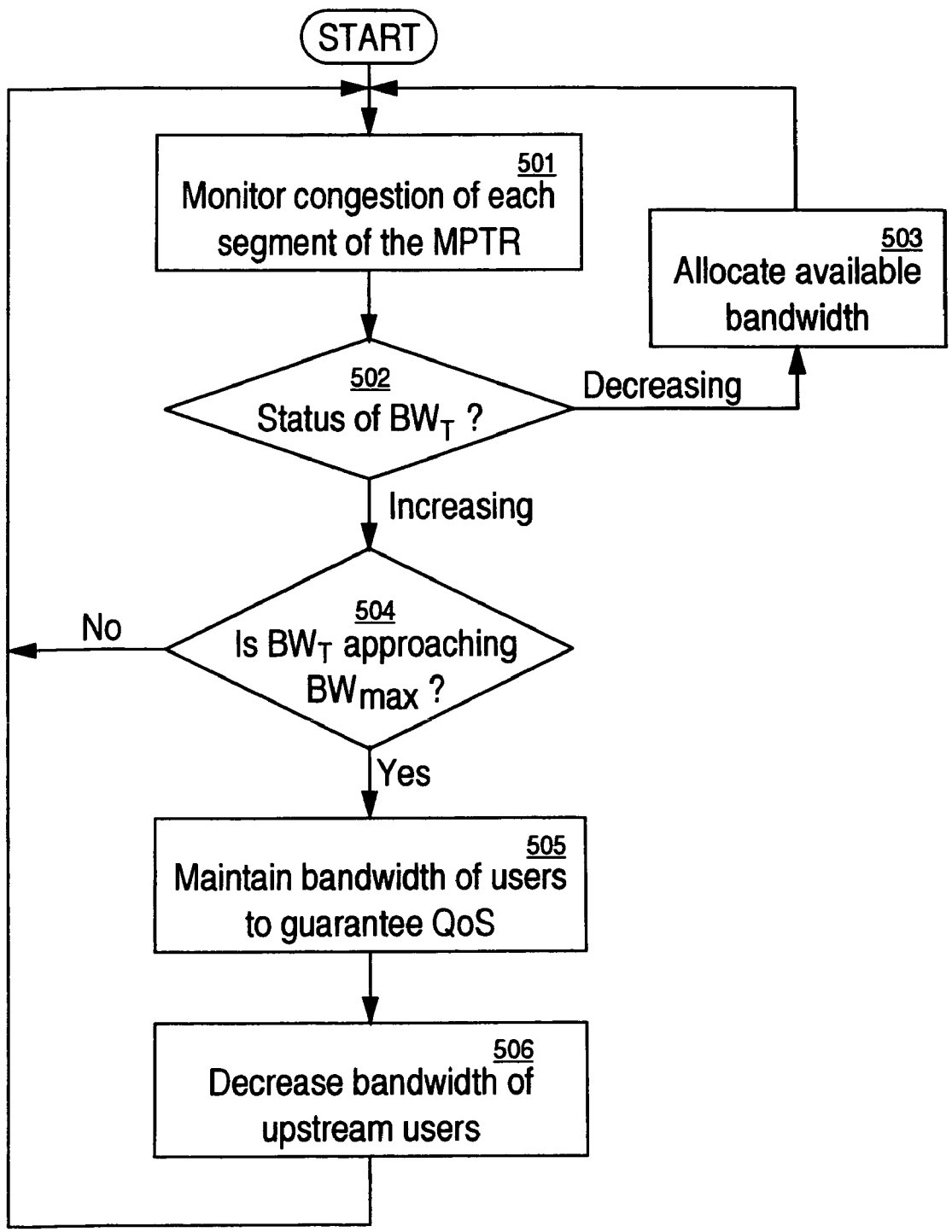
FIG. 5 is a flowchart describing the process by which an RMS manages bandwidth in an MPTR.

FIG. 5 is a flowchart describing the overall process by which an MPS manages bandwidth in an MPTR. A ring has a known, fixed maximum bandwidth capacity (BWmax). In the present invention, MPS's collectively ensure that the traffic flowing through any segment of the MPTR never exceeds this maximum bandwidth capacity. This is accomplished by each MPS continuously monitoring the traffic on the segments of the MPTR, step 501. The congestion (BWT) for a segment is calculated by summing all the upstream transmissions flowing through that particular segment. The congestion for any segment is continuously changing as users log on, log off, start transmissions, end transmissions, download files, upload files, etc. As the congestion varies over time, a determination is made as to whether the congestion is increasing or decreasing per step 502. If the congestion is decreasing, the MPS's allocate available or unused bandwidth to upstream active users, step 503. If there is enough bandwidth to meet all active user's needs, then the users are allowed to access the ring at their maximum transmission rates.

There may be circumstances whereby all active users have reached their maximum rate of transmission and yet not consume all the available bandwidth on a ring segment. Otherwise, the available bandwidth is allocated according to the weighted fair virtual queuing process of the present invention. But if it is determined that the congestion (BWT) is actually increasing, the MPS affected by the congestion determines whether the congestion (BWT) is approaching that segment's maximum bandwidth capacity (BWmax), step 504. If the maximum bandwidth capacity is not about to be exceeded, then all active users contributing to the traffic flowing through that particular segment are permitted to transmit at their current rate. However, if the congestion starts to approach the maximum bandwidth capacity (e.g., comes within three or four percent), then the bandwidth for all users contributing to the traffic flowing through that particular segment is allocated according to the weighted fair virtual queuing process.

For example, those users paying more for QoS services take priority over all other users, step 505. Accordingly, the MPS's allow the QoS users to have their paid-for portion of the bandwidth. This means that other lower priority users will necessarily have their bandwidth reduced, step 506. The bandwidth of users upstream to the point of congestion is reduced to a degree such that higher priority QoS users having traffic which flows through that segment are guaranteed their subscribed level of service and the total congestion through that segment does not exceed a certain percentage of the maximum bandwidth capacity. The data rates of the lower priority users are reduced according to the weighting function of the weighted fair virtual queuing process.

Figure 6:
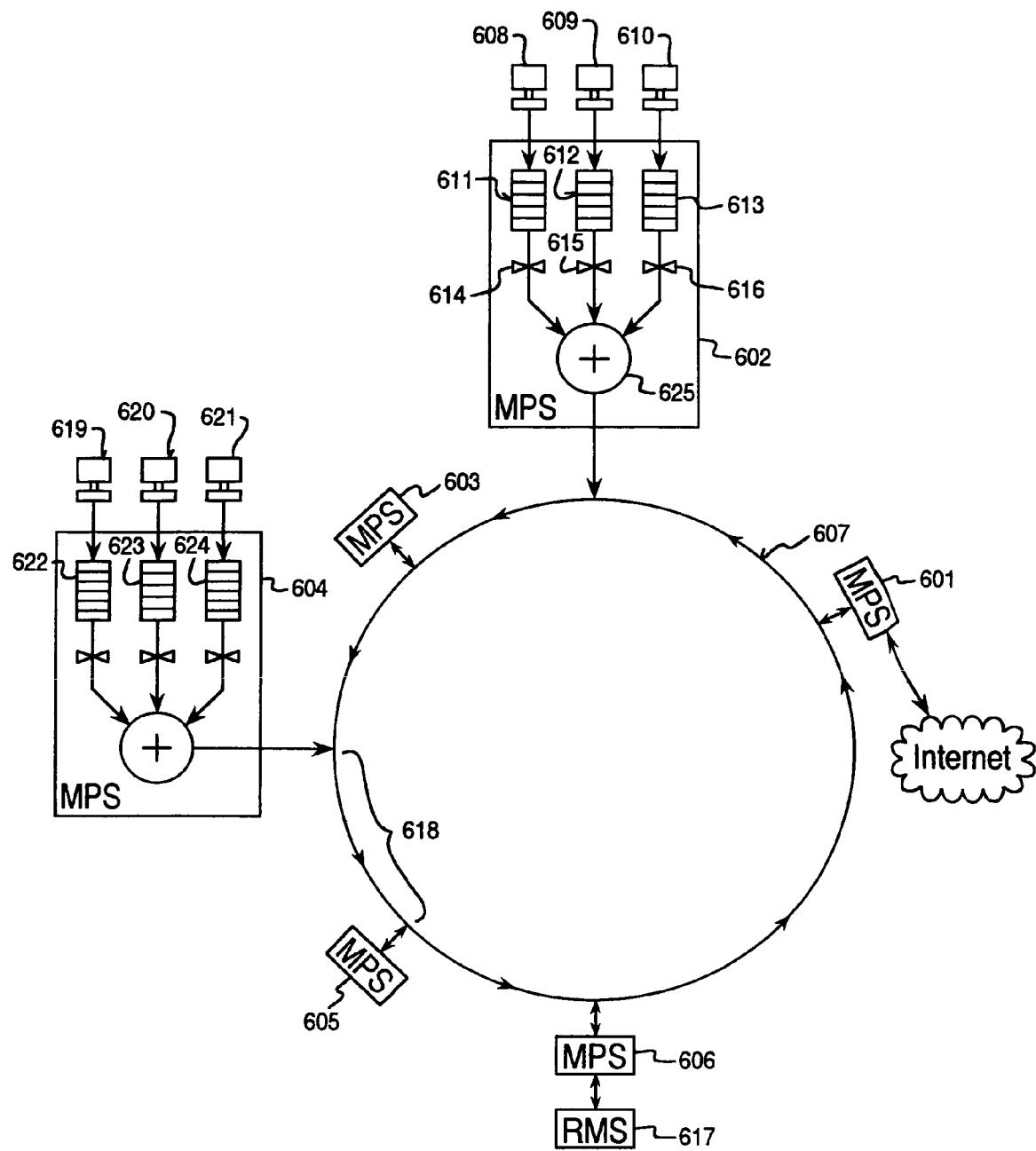
FIG. 6 shows an exemplary flow diagram for an MPTR.

FIG. 6 shows an exemplary flow diagram for an MPTR. A number of MPS's 601–606 are shown coupled to a fiber ring 607. Two of the MPS's 602 and 603 have been shown in greater detail to depict how data flows in an MPTR. A number of computers 608–610 are shown coupled to MPS 602. Each of these computers 608–610 has a corresponding buffer 611–613. These buffers 611–613 are used to temporarily store incoming data packets from their respective computers 608–610. Associated with each of these buffers 611–613 is a respective controller 614–616 which controls when packets queued in that particular buffer are allowed to be transmitted onto the ring 607. Once a packet is allowed to be transmitted out from MPS 602, it is inserted into an inserter 625 and added with the other outbound packets for that cycle.

The controllers existing in each of the MPS's 601–606 are initially provisioned and set-up by RMS 617. RMS 617 transmits control packets to each of the MPS's 601–606; the control packets sent to an MPS instructs that particular MPS on how to regulate the data flow rate for each of its ports by means of its controllers. This enables RMS 617 to individually specify the QoS level for the flow rates for each user coupled to ring 607. Once a packet is conveyed from an MPS onto ring 607, that packet is transmitted to its destination at the maximum rate of ring 607 and immediately forwarded through intermediary MPS's (if any).

To illustrate how QoS service is provided by the present invention, assume that the user on computer 608 pays for a QoS level which guarantees him a minimum bandwidth of 100 Mbps. Now, suppose that the traffic from MPS's 601, 502, 603, and 604 are such that ring segment 618 becomes heavily congested. MPS 605 immediately recognizes that ring segment 618 is congested since the unused bandwidth of ring segment 618 is insufficient for the insertion traffic of MPS 605. If the sum of the rates generated by each port of MPS's 601–604 starts to approach the maximum bandwidth capacity of ring segment 618, MPS 605 instructs one or more of the ports other than the one corresponding to computer 608 to slow down their insertion traffic data rates. For example, MPS 605 can send control packets to MPS 604 to decrease the insertion traffic flow rates associated with computers 619–621. The data rates associated with other ports are decreased until enough bandwidth becomes available so that the computer 608 can transmit at 100 MHz. Conversely, once computer 608 ends his transmission, MPS 604 and 605 become aware that additional bandwidth has become available and can take measures to increase data rates accordingly. In this example, MPS 604 may choose to restore the data rates associated with computers 619–621.

In the interim during which a computer transmits data packets faster than its MPS can insert those data packets onto the ring, data packets "back up" within in a FIFO buffer within the MPS. In the above example, the data rates associated with computers 619–620 were decreased. Suppose that the effect of these data rate reductions is that computers 619–620 generate packets faster than those packets are now allowed to be put on ring 607 (in order to guarantee the QoS of upstream computer 608). The extra data packets are stored in their respective buffers 622–624. Subsequently, when bandwidth becomes available, MPS 604 can increase the data rates at which packets associated with computers 619–621 are inserted onto ring 607. The back up of data packets within buffers 622–624 is eliminated by the increased rates of transmission onto ring 607. In some rare cases, buffers may overflow which results in packet loss. It should be noted that, technically, all data packets are first buffered in the first-in-first-out (FIFO) buffers before being put on the ring.

Additional descriptions of the architecture of the MPTR, MPS, and RMS can be found in U.S. patent applications "GUARANTEED QUALITY OF SERVICE IN AN ASYNCHRONOUS METRO PACKET TRANSPORT RING", filed on Jun. 30, 2000, Ser. No. 09/608,747, assigned to the assignee of the present invention which is incorporated herein in its entirety, and "PER-FLOW CONTROL FOR AN ASYNCHRONOUS METRO PACKET TRANSPORT RING", filed on May 13, 2004, Ser. No. 10/846,297, assigned to the assignee of the present invention which is incorporated herein in its entirety.

Figure 7:
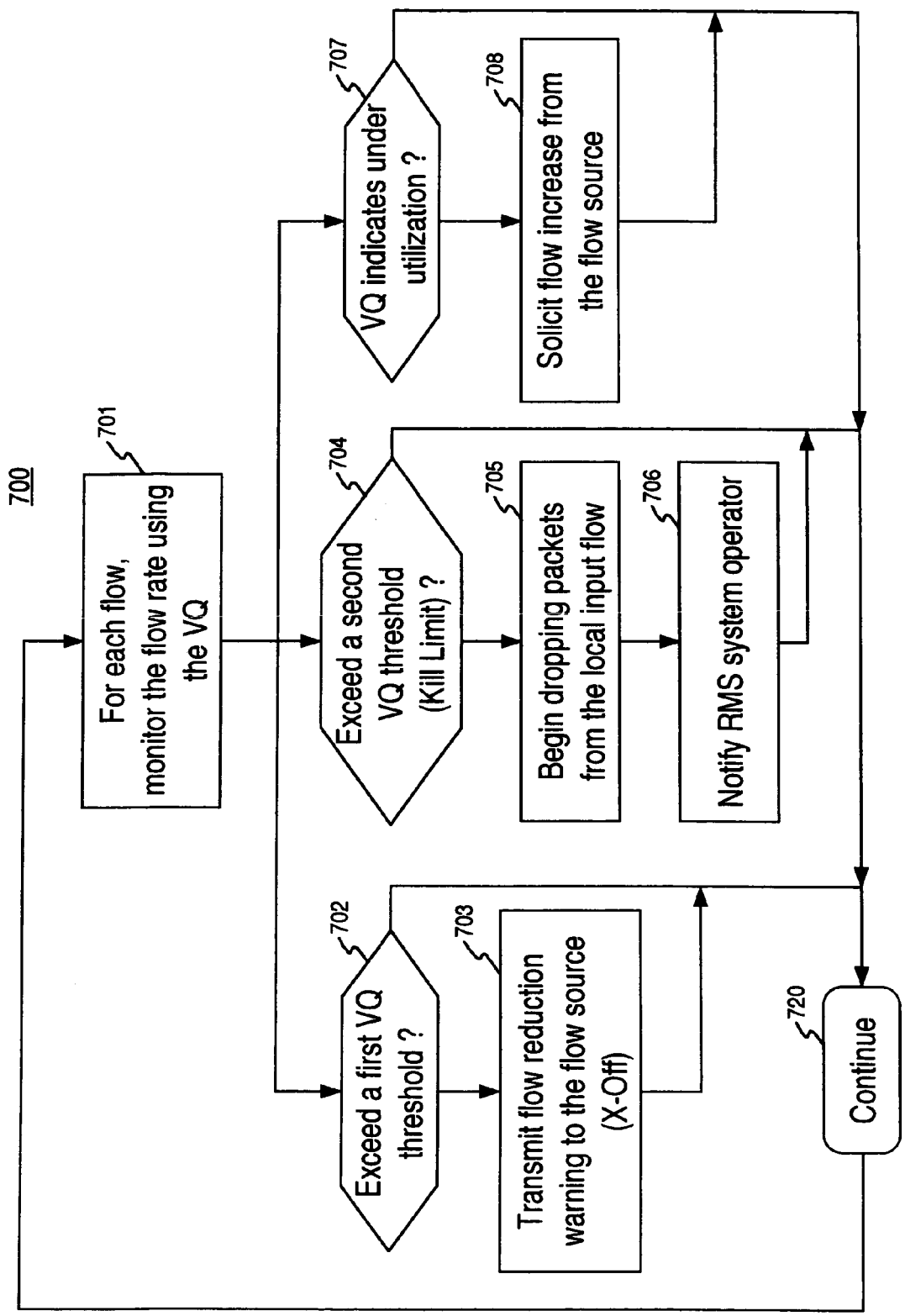
FIG. 7 shows an exemplary flow diagram for weighted fair virtual queuing as implemented by each MPS.

FIG. 7 shows a diagram of a virtual flow control process 700 in accordance with one embodiment of the present invention. Process 700 shows the operation of one buffer (e.g., within one MPS) in conjunction with the operation of the respective virtual queue which keeps track of the flow rate of the local input flow through the buffer.

Process 700 begins in step 701, where the flow rate of each flow in the MPTR is continually monitored using the respective virtual queue. As described above, a virtual queue is implemented for all flows to track the ring bandwidth utilization of the flows. As described above, each MPS is configured to aggressively allocate unused bandwidth to all flows. Usually, the spare bandwidth is allocated proportionally with respect to each flow's assigned QoS. As described above, however, higher priority QoS flows are maintained at the expense of lower priority flows when insertion traffic bandwidth is temporarily constrained.

The use of virtual queues allow the MPS to ensure QoS integrity without enforcing traffic compliance by dropping packets. In other words, bandwidth ulitilization is controlled by throttling the local input flows (e.g., the flow source) as opposed to dropping transit flow packets. The virtual queues are used to keep track of the backlog of the flows. The virtual queues are drained at the rate specified by the QoS scheduler and the backlog is measured in the units of time it takes to empty a virtual queue. The specifics of the operation of the virtual queues are discussed in greater detail below.

Referring still to FIG. 7, in step 702, 704, and 707, the flow rate of the flows are assessed via their respective virtual queues. In steps 702–703, if the backlog exceeds a first threshold (as indicated by the virtual queue), a flow reduction request is transmitted to the flow source requesting the source to reduce the rate at which packets are sent to the MPS. This first threshold is referred to as an "X-off limit". In steps 704–706, if the backlog exceeds a second threshold (e.g., referred to as a "Kill limit") the MPS begins dropping packets from the flow and subsequently notifies the RMS system operator. In steps 707–708, in a case where the allocated bandwidth is under-utilized, the MPS solicits a flow increase from the flow source in order to minimize wasted bandwidth. As indicated by step 720, this process continues, as data from the source is continually inserted onto the ring for transmission. The operation of the virtual queues, threshold levels, and signaling messages within the MPTR are discussed below.

Referring now to FIG. 8, a table 800 depicting the structure of a flow description database maintained in each MPS is shown. In order to calculate bandwidth allocation and monitor QoS compliance for the local input flows, each MPS maintains a database tracking the relevant parameters for their respective local input flows. QoS levels are specified by the reservation of a given level of bandwidth. At the reservation of a bandwidth level, each MPS along the path is given the flow specification, e.g., the reserved bandwidth. Collectively, this information is referred to as a Flow Information Base (FIB) and is maintained within each MPS along the path. Table 800 depicts the structure and format of one such FIB.

In one embodiment, the FIB is used as follows. The flow identifier (Flow ID) is implicitly indicated by its location in the table 800. The action field is one bit, and is used by the MPS QoS scheduler to mark an uncooperative flow whose packets are to be subsequently dropped. The direction field indicates a primary direction which the flow should take. The backup field specifies the bandwidth allocation policy given to the flow in the event of ring failure reroute. The flow destination field indicates forwarding action to MPS. The flow type is used by the MPS to sort packets for into four QoS traffic categories: CBR, VBR, ABR and UBR, then gives inserting priority accordingly. In this embodiment, CBR traffic is afforded the highest priority, and thus, the highest QoS. Accordingly, a goal of the MPTR is to reduce the jitter of CBR traffic by giving it strictly highest priority when an MPS adds traffic on to the ring.

The reserved rate field stores the value of the guaranteed rate of the flow. The finish time field is used by the QoS scheduler for internal accounting and will be discussed in greater detail below.

Once the flow is set up on FIB by the RMS, the MPS can begin to monitor the traffic and calculate its fair share of the egress bandwidth of the MPS. The calculation is given below. Note that the following calculation can take place at the sending MPS with appropriate information given by the congested MPS.

Allowed rate for flow$(i) = r_i + w_i (\text{Link } BW - \Sigma r_i / \Sigma w_i)$ Where:
$r_i$=reserve rate for flow I;
$w_i$=allocated weight for flow I; and
Link BW=total bandwidth of a ring segment.

Other methods of rate allocation can also be supported. To monitor the traffic, each MPS employs a virtual queue (VQ) to monitor the traffic of each flow. An MPS uses the VQ to both monitor the short-term average (0.1–1 ms) rate of flow and determine the total number of active flows.

The use of virtual queues allow the MPS to ensure QoS integrity without enforcing traffic compliance by dropping packets. As described above, each flow is assigned a respective VQ. It should be noted that a VQ is not a physical queue that performs per flow queuing as in most Fair Queue (FQ) techniques. A VQ as used in the present invention is responsible for keeping track of the backlog of the local input flow as if there were actually a physical queue buffering the packets. Each VQ is drained at the rate specified by the QoS scheduler. The backlog is measured in the unit of time it takes to empty the virtual queue, i.e., the finish time of the last packet. At the arrival of a packet, a new empty time for the corresponding VQ is calculated as follows.

If the virtual queue is empty:

Empty time=current time+(packet length)/(the reserved flow rate);

Otherwise:

Empty time=previous empty time+(packet length)/ (the reserved flow rate);

In effect,

Empty time=max (current time, previous empty time)+(packet length)/(the reserved flow rate);

The degree of backlog serves as the indication of QoS rate compliance. A backlogged VQ indicates that the corresponding flow may exceed the allowed rate and need to be throttled down. Non-backlogged VQs indicate that the corresponding flow under-utilizes the service or may be inactive. In each MPS, all flows with empty VQs for a period of time are considered inactive. In this manner, each MPS bases its flow control primarily on the level of VQ backlog.

If the backlog of a virtual queue exceeds the first threshold (approximately a round trip delay of the ring), the MPS sends a warning to the flow source with an explicit rate that the source needs to throttle its maximum rate to. This limit is referred to as an "X-off limit". The second threshold is a drop threshold (approximately twice the round trip delay). If the violating flow source continues to ignore the warning when its backlog exceeded the first warning threshold, the backlog will reach the second drop threshold. The MPS will subsequently drop incoming packets belonging to the violating flow until the backlog drops below the drop threshold or there is no backlog in the virtual queues. This second threshold is referred to as a "Kill Limit". In normal operation, an MPS should not drop any transit packets. Only local input flow packets can be dropped, and even then, only in the case of malfunctions, such as when the flow source fails to recognize warning messages or fails to control its rate. In any event, the RMS network management is usually informed of the occurrence, and the corresponding Service Interface Module (SIM) is typically be taken out of service and replaced. The following pseudocode routine summarizes the flow control policy:

If (the empty-time of a VQ>Kill limit)
    Discard the packet
If (the empty-time of a. VQ>X-off limit)
    Send the flow source an X-off message
If (the empty-time of a VQ indicates under utilization)
    Solicit a flow rate increase from the flow source It should be noted that like many per flow QoS algorithms, a large number of flows presents computation complexity. In order to determine the worst backlogged VQ or to determine which VQ becomes empty, the QoS scheduler of an MPS needs to compare the finish time of each VQ with current time. However, direct comparison is not an efficient approach for a large number of VQs because the computation complexity of direct comparison is O(N) where N is the number of flows.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. In a metropolitan area network, a method for implementing weighted fair flow control on the network, the method comprising the steps of:
   a) accepting a plurality of local input flows at each of a plurality of MPS for transport across a communications channel;
   b) transporting data among the MPS via the communications channel asynchronously, wherein the plurality of MPS include at least one upstream MPS and one downstream MPS;
   c) for each MPS:
      c1) assigning a QoS to each local input flow;
      c2) allocating a portion of insertion traffic bandwidth of the MPS to each local input flow in accordance with the QoS to implement weighted bandwidth allocation;
      c3) inserting the insertion traffic of the MPS onto the communications channel using an available opening in the communications channel;
      c4) if the insertion traffic needs to be reduced, reducing the allocation to those local input flows having a lower QoS before reducing the allocation to those local input flows having a higher QoS; and
   d) if the downstream MPS experiences congestion, throttling the insertion traffic of the upstream MPS to implement fair bandwidth allocation.

2. The method of claim 1 wherein the QoS includes at least a first level and a second level, the first level having a higher priority than the second level.

3. The method of claim 1 wherein the communications channel is an ethernet communications channel.

4. The method of claim 3 wherein the communications channel is a 10 gigabit ethernet communications channel.

5. The method of claim 1 wherein the metropolitan area network is a ring topology metropolitan area network.

6. The method of claim 1 wherein transit traffic on the communications channel is given strict priority with respect to insertion traffic from each MPS.

7. The method of claim 1 further including the step of:
   minimizing jitter for higher QoS local input flows by reserving a portion of the insertion traffic of each MPS for the higher QoS local input flow.

* * * * *